United States Patent [19]
Hamilton et al.

[11] 3,713,967
[45] Jan. 30, 1973

[54] ENERGETIC NEUTRAL PARTICLE INJECTION SYSTEM FOR CONTROLLED FUSION REACTOR

[75] Inventors: Gordon W. Hamilton; Ralph W. Moir, both of Livermore; John E. Osher, Alamo; Richard F. Post, Walnut Creek, all of Calif.

[73] Assignee: The United States of America as represented by the United States Atomic Energy Commission

[22] Filed: June 18, 1971

[21] Appl. No.: 154,457

[52] U.S. Cl. ..............................176/5, 176/1, 176/3, 310/10
[51] Int. Cl. ..............................................G21b 1/02
[58] Field of Search ...............176/1, 3, 5; 310/10, 11

[56] References Cited

UNITED STATES PATENTS

| | | | |
|---|---|---|---|
| 3,663,360 | 5/1972 | Post | 176/3 |
| 3,582,849 | 6/1971 | Post et al. | 335/213 |
| 3,152,959 | 10/1964 | Damm | 176/1 |
| 3,324,316 | 6/1967 | Cann | 176/1 |
| 3,500,077 | 3/1970 | Post | 176/3 |

*Primary Examiner*—Reuben Epstein
*Attorney*—Roland A. Anderson

[57] ABSTRACT

System including an ion source, particle accelerator and neutralizer cell for producing an energetic neutral particle beam which is directed into the containment zone of a controlled fusion reactor. Said beam includes a significant proportion of ionized particles and a proportion of the energetic neutrals are not trapped in the containment zone. Magnetic field means are used to deflect the ionized particles from the neutral particle beam and an ionizer cell is used to ionize neutral particles escaping from said containment zone. Means including spaced arrays of grid structures are arranged to deflect electrons and collect the deflected and reionized particles in a manner adapted to collect and convert the kinetic energy of the particles into electrical energy.

7 Claims, 3 Drawing Figures

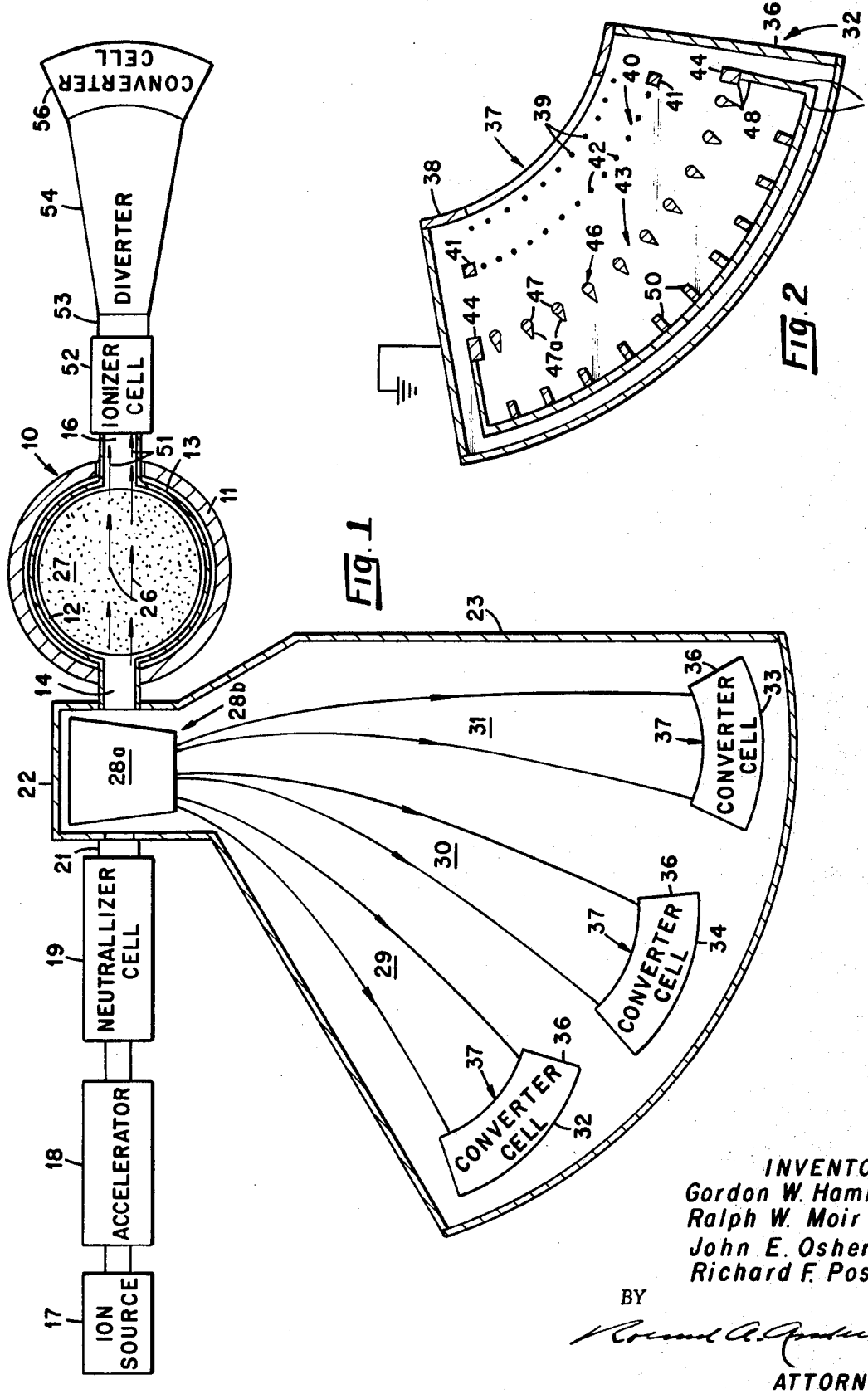

INVENTORS.
Gordon W. Hamilton
Ralph W. Moir
John E. Osher
Richard F. Post

ENERGETIC NEUTRAL PARTICLE INJECTION SYSTEM FOR CONTROLLED FUSION REACTOR

BACKGROUND OF THE INVENTION

This invention was made under, or in the course of Contract No. W—7405—ENG—48 with the United States Atomic Energy Commission.

For producing high temperature plasmas, for example, in controlled fusion reactors, the reactant plasma may be established or augmented by injection of energetic neutral particles which are ionized and trapped in the magnetic containment zone of the reactor. Typically the beams of energetic neutral particles are provided by means of an arrangement which includes an ion source which directs relatively low energy ions through a charged particle accelerator whenceforth the accelerated ions are directed through a neutralizer means forming said beam of energetic neutral particles which is directed into the controlled fusion reactor containment zone. Energetic neutral particle injection is employed particularly in fusion reactors in which the magnetic containment field is maintained continuously, e.g., in the ALICE Magnetic Mirror type machine; in the Tennis Ball Seam coil type devices described in the Proceedings of the Second International Conference on Magnet Technology, Oxford, England, July 10—13, 1967; and in the Yin-Yang coil type machines disclosed in the copending application of Richard F. Post and Ralph W. Moir, Ser. No. 881,787 filed Dec. 3, 1969, now U.S. Pat. No. 3,582,849, issued June 1, 1971.

While the ion source-accelerator combination used to produce the energetic ions may operate with high efficiency, the neutralization operation, generally effected in a gas cell neutralizer, generally is limited to moderate to low efficiencies dependent on the ionic species involved. Moreover, trapping of the injected neutral particles in the reactor containment zone is generally far from complete so that a significant if not major proportion of the injected particles may emerge from the containment zone as a directed beam. The unneutralized charged particles and the particles which are not trapped in the containment zone represent a severe energy loss particularly in a large power generating controlled fusion reactor resulting in a low or unacceptably reduced efficiency usually denoted as a parameter Q which is equivalent to the ratio of fusion power to net injected particle power. The particle power is that which is required to produce the injected particle beam. A net reduction in the power required to produce the injected particle beam can be a crucial factor in determining the efficiency of the reactor or the practicability of particular fuel cycles. A need for improvement in this respect therefor exists.

SUMMARY OF THE INVENTION

The invention relates generally to the injection of energetic neutral particles into controlled fusion reactors and, more particularly, to a system for injecting energetic neutral particles into the magnetic containment field of a controlled fusion reactor, said injection means including means for recovering the energy of unneutralized charged particles in the energetic neutral particle beam and of neutral particles emergent from said containment zone.

The energetic neutral particle injection system of the invention comprises means such as an ion source, accelerator and gas or vapor neutralizer cell in tandem combination for producing an energetic neutral particle beam in accord with practice common in the controlled fusion reactor art. In use the neutral particle injector system is arranged to direct an energetic neutral particle beam into the magnetic containment field zone of the reactor where a substantial portion of the energetic neutral particles are ionized by Lorentz forces or by collision with neutral or charged gas particles and are accordingly trapped to form a high temperature plasma in said containment zone. Energetic neutral particles which may be injected may comprise one or more light nuclide fusionable fuel materials such as $^1$H, D, T, $^3$He, etc., in various proportions determined by the particular fuel cycle selected, and the ions trapped to form the plasma may include $^1$H$^+$, D$^+$, T$^+$, $^3$He$^+$, etc. In lower powered reactors, particle energies of the order of 1 to 100 keV may be provided; however, in large scale power producing fusion reactor design particle energies in the range of 100 keV to above about 1.5 MeV at very large beam currents may be used.

Generally speaking each particle species in the beam has a relatively narrow energy range, i.e., the particle energies of each species is relatively monoenergetic although the resulting reacting fusion plasma particles may have a wide statistical spread in energies. The neutral particle beam emerging from the neutralizer cell also contains a large proportion, e.g., about 25 to about 75 percent of the injected high energy unneutralized ions dependent on the species and energy used. With known type neutralizers competitive interactions such as charge exchange and reionization establish a practical limit on the degree of particle neutralization which can be achieved. These charged particles are deflected by the magnetic field of the reactor and therefor are lost from the system. The energy of the deflected particles represents a large energy loss and may drastically reduce the net power output obtainable from the reactor. Moreover, the deflected particles can cause deleterious damage to components, for example, by bombarding reactor components and add to the extraneous gas load in the reactor vessel. Only a fractional proportion of energetic neutral particles which are injected into one side of the reactor containment zone are ionized and trapped while the remainder, often as much as 50 percent or more, are not ionized in the containment zone and they traverse the containment zone and emerge as a narrowly divergent beam on the opposite side thereof. This emergent neutral particle beam is also essentially monoenergetic and represents a large power loss as well as creating a disposal problem.

In accordance with the invention magnetic field generating means are arranged between the neutralizer cell and the magnetic containment field of the reactor to apply a magnetic field across the beam path effective to deflect charged particles away from the beam. Generally speaking, particles of each charge to mass ratio are deflected along a relatively narrow curved beam path with the individual pathways being angularly displaced from each other in a fan-like array. Electrons present in the neutralizer beam are attracted by the positive charge of the deflected ions and accompany the ions along the aforesaid beam pathways in proportions sufficient to substantially neutralize the positive ion space charge. Further, in accordance with the invention a power generating collector is interposed across each of said beam pathways to convert the kinetic energy of the ions into electrical energy for reuse or delivery to an electrical power distribution system. More particularly, said collector includes a first grounded grid with a second grid array arranged therebehind to which a negative potential is applied to repel and reject the electrons from the deflected ion beam and allow the positive ions to pass therethrough. A third grid array is disposed behind the second grid array in substantially parallel spaced position thereto and effective to intercept the positive ion beam passing therethrough. The third grid array is biased to a positive potential slightly less than the magnitude of the substantially monoenergetic energy level of the positive ions which are therefore retarded and slowed down by the positive bias potential. The retarded ions thenceforth become defocussed so as to impinge upon a collector surface situated behind the members of the third grid array with little residual kinetic energy. Thereat they combine with electrons generating an electrical current in a circuit connected thereto at a potential approximating the retarding bias potential which is a little less than the equivalent energy of the positive ions. The circuit which applies such retarding bias potential is arranged to drain off the generated current while maintaining an appropriate retarding bias potential and thenceforth to deliver the generated current in a form suitable for reuse or for distribution otherwise.

As for the energetic neutral particle beam which traverses the reactor containment zone, a gas cell or other particle ionizer means is arranged in the path thereof to reionize such emergent energetic neutrals. Since the emergent beam has a very low divergence the beam power per unit area may generally exceed the capacity of the biased grid collector structure described above. Accordingly, the reionized particle beam is passed through a decreasing magnetic field gradient or defocussing magnetic field to expand the beam angularly and then the expanded beam is directed into a power generating collector as above.

Accordingly, it is an object of the invention to improve the efficiency of energetic neutral particle injection systems used in conjunction with a controlled fusion reactor.

Another object of the invention is to provide means for recovering energy resident in charged particles present in an energetic neutral particle beam.

Still another object of the invention is to provide means for recovering energy resident in energetic neutral particle beams produced, for example, incident to operation of a controlled fusion reactor.

Other objects and advantageous features of the invention will be apparent in the following description taken in conjunction with the accompanying drawing, of which:

FIG. 1 is a plan view partially in cross section illustrating a controlled fusion reactor and associated energetic neutral particle injector with associated means for recovering the energy of charged particles remaining in the beam as well as means for recovering the energy of energetic neutral particles exiting from the containment region of the reactor;

FIG. 2 is a transverse sectional view of a collector cell of the system shown in FIG. 1.

DESCRIPTION OF THE INVENTION

Figure 3:
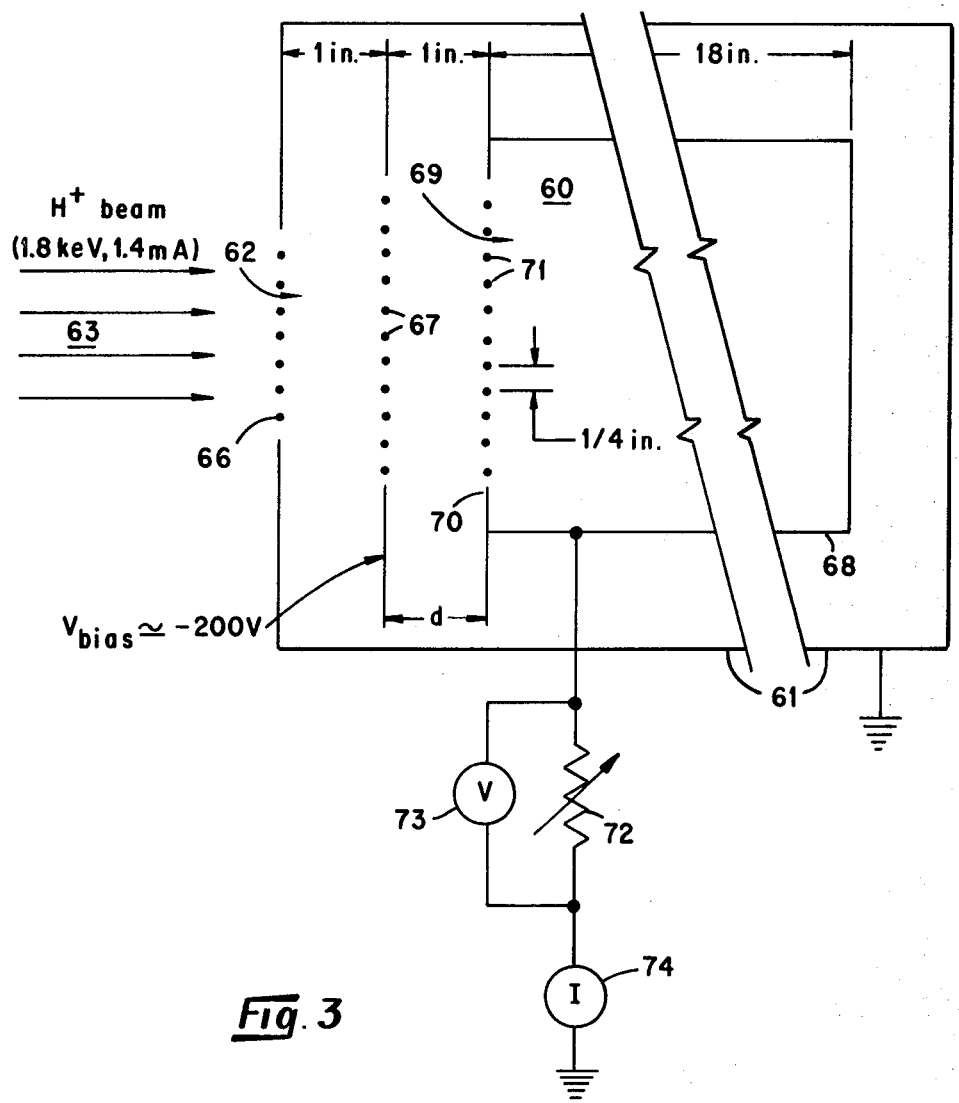
FIG. 3 is a horizontal sectional view of an experimental collector energy converter cell in accord with the invention.

For purposes of describing the invention reference will be made to a typical Baseball Seam or Yin-Yang Coil Type mentioned above; however, it will be understood that the system of the invention can be used with any other type of fusion reactor with which energetic neutral particle injection can be used. In FIG. 1 such a reactor 10 is represented by a generally spheroidal magnet coil 11 defining a cavity 12 therein in which is provided a vacuum vessel 13 having beam input and exit conduit ports 14 and 16, respectively. An energetic neutral particle injector for use with such a reactor may comprise an ion source 17, which directs a beam of energetic fusion fuel ions through a charged particle accelerator 18. The charged particle beam from accelerator 18 is then directed through a neutralizer cell 19 wherein only a portion of the energetic ions undergo neutralizing collisions with an appropriate gaseous or vaporous medium and acquire an electron if a positive ion is involved, lose an electron if a negative ion is involved or undergo other possible interaction so as to emerge through beam tube 21 as a beam of energetic neutrals containing residual energetic positive ions accompanied by electrons. Energetic neutral particle injectors have been constructed with considerable variation. Specific details of one such are disclosed in U.S. Pat. No. 3,152,959, issued Oct. 13, 1964, to C. C. Damm for Injection Method and Apparatus for Controlled Fusion Reactors. In that system, the accelerator portion is included in the ion source and hydrogen, helium, nitrogen, water vapor or other suitable gas is employed in the neutralizer cell. In other versions of such a gas cell Mg, Na, Li, K and other metallic vapors have been used and excited state energetic particles which are more easily ionized by Lorentz forces may be produced in other arrangements. All such are adapted for use with the present invention. For high current high voltage use separate ion source-accelerator units are preferable. Similar systems in which negative ions are produced, accelerated and ionized to remove the electron are also known. With such systems only one ionic species is generally present in significant amounts.

A variety of light nuclide fusionable nuclides such as $^1H$, $D$, $T$, $^3He$, $^6Li$ alone or in various combinations and proportions as appropriate may be used as fuel in such a reactor. Principal fusion reactions which have been considered are as follows:

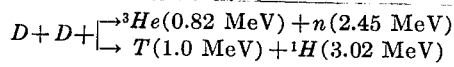

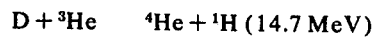

In the event an energetic neutral injector is used wherein the original ion beam is $D^+$, mainly $D^+$ with possibly some $D_2^+$ ions will be present in the energetic neutral particle beam. However, if $D_3^+$ is used instead the energetic neutral beam will include $D^+$, $D_2^+$ and $D_3^+$ ions. Where $D^-$ ions are used instead essentially only $D^-$ ions will appear in the energetic neutral fuel particle beam.

For purposes of illustration, reference will be made to an injector in which $D_3^+$ ions are employed and $D_2^+$ and $D^+$ ions are also present. On passage through the accelerator the aforesaid ions are accelerated to a multiple of the accelerator voltage, e.g., with a 500 keV accelerator, 500 keV, $D^+$, 1 MeV $D_2^+$, and 1.5 MeV $D_3^+$ ions are formed. The neutralizer yields 500 keV energetic neutrals ($D°$) which together with $D^+$, $D_2^+$ and $D_3^+$ ions emerge through beam tube 21. As much as 50 percent or more of the incident charged particles may not be neutralized. Since injection current of the order of 1,000 amperes of ions may be used the unneutralized ions represent a large energy loss.

In accordance with the invention the aforesaid emergent neutralizer beam is directed from beam tube 21 through the narrow end portion 22 of a converter vacuum vessel 23 which is to enclose the energy converting collector cells. Beam tube 21 is aligned with input conduit port 14 of reactor 10 so that energetic neutrals traverse vessel portion 22, enter central regions of reactor vessel 13 as a beam 26 wherein a substantial proportion of the energetic neutral particles are ionized by Lorentz forces, by collision with residual gas molecules or plasma particles and are trapped to form a contained controlled fusion plasma 27.

In accordance with the invention electromagnet pole pieces 28a, 28b, or an equivalent magnetic field producing means are disposed in juxtaposition across the beam path in vessel portion 22 to produce a magnetic field therebetween effective to deflect or focus the charged particles angularly away from the neutralizer beam passing therethrough to follow a second beam path. Beam 26 accordingly comprises energetic neutral particles substantially free of energetic charged particles which facilitates operation of reactor 10. The aforesaid magnetic field producing means may be constructed in a manner somewhat similar to those employed, for example, in mass spectrometers disclosed in "Mass Spectrometry", McDowell, McGraw-Hill Book Company, Inc., Copyright 1963. In view of the differing mass to charge ratios and energies of the charged particle species in the neutralizer beam emergent from beam tube 21, the ionic species are deflected to follow beam paths that are angularly displaced from each other. More specifically, using the indicated D fuel cycle, the $D^+$ ions are deflected through the largest angle to follow beam path 29, $D_3^+$ ions are deflected the least to follow beam path 31 and $D_2^+$ ions are deflected along an intermediate path 30 within the enlarged portion of vessel 23. The beams so deflected diverge somewhat in width.

At an appropriate position therealong where the energy density has decreased to a level which can be tolerated a gridded collector-converter cell 32, 33, 34 is disposed in fixed relation to transect beam paths 29, 31, 32, respectively, as shown in FIG. 1. Collector-converter cells 32, 33 and 34 are constructed as shown in FIG. 2 of the drawing with specific reference to cell 32. Such cells are constructed with a closed generally annular sector shaped housing 36 having an opening 37 in the inner arcuate wall 38 to allow entry of the respective beam 29, 31 or 32 therein. A first gridwork of wire or rod members 39, e.g., of tungsten or molybdenum is arranged transversely across said opening 37 for example using metallic framework (not shown) or the equivalent and are connected to housing 36 through said framework or otherwise as appropriate to establish a ground potential reference level thereacross. Spacing of members 39 is correlative with energy level being about 0.25 inch for about 2 keV to about 8 inches for about 500 keV, etc.

The gridwork is made as "open" as possible to provide as little interference with the incident beam as possible. For example, using wire with a diameter of as low as about 0.001 inches at lower energies, and corresponding spacing a gridwork of about 99 percent openness providing about 99 percent transmission of the beam can be used. These members may also have a ribbon or thickened leading edge configuration described hereinafter. Inwardly within the vessel 36 along the beam path a second gridwork 40 is arranged in substantially concentric or parallel relation to the first gridwork to similarly transect the beam path after passage through the first gridwork. The second gridwork may be constructed as a metallic framework, only the vertical side members 41 of which are shown, with grid members 42 strung between upper and lower side members (not shown). Typical pin alignment-wire tensioning arrangements may be used to assure alignment of the gridwires which should also be as thin as possible to assure maximum beam transmission. The second gridwork is disposed in fixed insulated relation within the vessel 36 as by mounting said framework on insulating standoffs (not shown) supported by the vessel walls. Still further inwardly along the beam path a third gridwork 43 is arranged. Gridwork 43 may also be constructed with a framework, only side members 44 of which are shown. Grid members 46 will generally be required to dissipate a considerable heat load created by impingement of charged particles thereon and must therefore be made more massive or provided with cooling means. However, heat dissipation can be achieved by utilizing a flat metallic ribbon or thin metallic generally rectangular bar grid member (not shown) arranged with a narrow edge facing the beam. A member having a width to thickness ratio of about 10:1 may suffice. However, it is preferable to employ a grid member 46 having an enlarged rounded leading edge portion 47 and a tapered trailing edge portion 47a as shown in FIG. 2. Heat created by impingement of particles on the leading edges 47 may then be conducted through the body of members 46 and be dissipated by radiation therefrom. The walls of housing 36 may be provided with cooling coils (not shown) to dissipate the radiant heat load. Alignment of the foregoing members 46 may be effected by means of slotted members or offset sequential pins on the lower framework member (not shown) and the end affixed to the framework. The upper ends of members 46 may likewise be aligned by using slotted members or sequential pins (not shown) mounted on the upper framework member (not shown). The upper ends may be supported by means of a spring loaded shackle (not shown) to accommodate expansion and shrinkage with varying heat loads.

To provide a collector electrode assembly 48, framework 44 is mounted so as to support the grid members 46 across the open mouth of a closed generally arcuate collector vessel 49 and is connected conductively thereto. The collector vessel 49 includes fin members 50, honeycomb gridwork or similar arrangement to assist in collecting impinging particles and to dissipate heat. Assembly 48 and attached third grid are supported in insulated relation to vessel 36 by means of standoff insulators or the like (not shown). The collector assembly 48 and components therein may be arranged for cooling with a heat exchange medium, e.g., water in a conventional arrangement (not shown) as may vessel 36.

For operation with positive ion beams a negative electrical potential is applied to the second grid 40 from a power supply (not shown). The negative potential is selected to be of a magnitude sufficiently large to repel electrons in the beam and allow the monoenergetic ions to pass. The repelled electrons are collected at the first grounded grid and on the walls of vessel 36 creating a low voltage electrical current generally representing a power loss of a magnitude too low to warrant recovery. The negative potential may generally be of the order of about 10 percent of the retarding voltage applied to the third grid. For example, about 180 to 200 volts negative for a 1.8 keV $^1H^+$ beam to about 50 kilovolts for a 500 keV $D^+$ beam.

For collecting the ions passing through grid 40 a positive retarding potential is applied to grid 43 from a power supply (not shown). The magnitude of the retarding potential is selected to be slightly less, i.e., 1–5 percent less than the equivalent energy of the monoenergetic ion beam. Consequently, the ions are retarded and slowed to a relatively low velocity as they approach grid 43. The ion paths, moreover, become defocussed so that a minor proportion of the ions are diverted to collide with a low residual kinetic energy with grid members 46, especially with the enlarged leading edge portions 47. While the major proportion impinge upon fin members 50 and the rearward wall of assembly 48. In doing so, the ions acquire electrons from the grid members and escape as low energy neutral particles or gas molecules. Electrons flowing through the retarding potential power supply or an appropriate supplementary circuit associated therewith (not shown) represents a power supply which may be reused in the reactor, e.g., in the ion sources, accelerator, magnet power supply vacuum pumping system or otherwise be delivered to other power distribution system. More specific details as to the operation of retarding potential particle energy collector conversion systems and circuitry for applying retarding potentials as well as distributing recovered power are disclosed in copending application Ser. No. 63,582(70, filed Aug. 13, 1970 by Richard F. Post, now U.S. Pat. No. 3,663,360, issued May 16, 1972, and in application Ser. No. 72,294(70), filed Sept. 15, 1970 by Ralph W. Moir. The disclosure of such applications is incorporated herein by reference.

The untrapped portions of the essentially monoenergetic energetic neutral particles, e.g., $D^\circ$, which pass through the plasma 27, exit through exit conduit port 16 as a beam 51. Beam 51 is directed through a gas cell 52 or equivalent ionizer means to emerge through output port 53 thereof as a plasma beam mixture of ions ($D^+$) and electrons. The plasma beam generally is narrowly divergent and has an energy density in excess of that which can be tolerated by a collector system. Accordingly, the plasma beam is expanded radially and in thickness if desired by passage through an expander 54 or equivalent means. The theory of and details of such an expander are disclosed in the aforesaid applications of Richard F. Post and Ralph W. Moir. In brief, the expander includes arcuate electromagnet conductors arranged oppositely across the particle beam path and creating a magnetic field having a relatively high intensity at the inlet end and decreasing along the beam path. Beam sweep apparatus may also be used. The expanded beam now following a laterally flared path is then directed into a converter cell 56 similar in construction to cells 32, 33 and 34 arranged to convert the kinetic energy of the ions into electrical power for use as above. The expander vessel may be connected in sealed insulated relation to collector 56 or collector 56 may be disposed in a separate vacuum vessel as above.

Auxiliary equipment is employed herein as in general practice within the controlled fusion reactor art. In may be noted that high evacuation rate vacuum pumping means are connected to evacuate the converter cell vessels 36 to remove the gas molecules produced therein as well as to evacuate the interconnected portions of the complete vacuum system.

Further details of the system of the invention will be set forth in the following illustrative Example:

EXAMPLE

A collector-converter cell 60 shown in FIG. 3 of the drawing was employed to convert the kinetic energy of a 1.8 keV, 1.4 mA beam of $H^+$ ions into electrical energy. More particularly, the collector cell 60 is constructed with a rectangular box enclosure 61 having an opening 62 to permit entry of the beam 63 of $H^+$ ions. A first grid of ¼ inch spaced 0.001 inch diameter tungsten wires 66 is provided across opening 62 to establish a ground potential reference plane thereacross. At a spacing of one inch a second grid of wires 67 is disposed in insulated parallel relation to the first grid and a negative bias potential of −200 volts is applied thereto from a power supply (not shown). A cuplike collector 68 having a depth of 18 inches is suspended in fixed insulated relation in enclosure 68 with an opening 69 in side 70 facing the second grid and having a third grid of wires 71 provided thereacross which is disposed in parallel, 1 inch spaced relation to the second grid. A positive retarding potential is developed on the third grid and on the vessel 68 by connecting a variable resistance load 72 between vessel 68 and ground. The voltage is measured by means of a voltmeter 73 connected across resistance 71 and, the current, by means of an ammeter 74 connected in series therewith. As ions are collected a current is generated developing the retarding voltage across resistance 71. A varied bias power vacuum tube (Kenotron) was used in experiments. In practice a distribution system would be substituted. Using the foregoing arrangement 94.8 percent of the energy of the ions in the beam was converted to electrical current.

While there has been disclosed in the foregoing what may be considered preferred embodiments of the invention modifications may be made therein without departing from the teachings of the invention and it is intended to cover all such as fall within the scope of the appended claims.

What we claim is:

1. In apparatus for producing a controlled fusion reaction comprising means for producing a magnetic field defining a high temperature plasma containment zone and means for producing and directing a beam of energetic neutral particles along a beam path into said containment zone, said beam containing a significant proportion of energetic positive ions and electrons, in combination therewith;

means for producing a magnetic field along a section of the path of said beam between said containment zone and said means for producing and directing a beam of energetic neutral particles therein and effective to deflect charged particles accompanied by electrons as a second beam away from said beam of energetic neutral particles to travel along a second path inclined angularly away from said beam; and collector-converter cell means including means for repelling electrons away from the second beam to yield a beam of energetic charged particles traveling along said second path, and a positively charged particle collector structure for retarding and collecting said charged particles at an electrical potential approaching the kinetic energy of said charged particles so that said charged particles acquire electrons on impact with said collector generating an electrical potential thereon.

2. Apparatus as defined in claim 1 wherein said means for producing and directing a beam of energetic neutral particles into said containment zone comprises ion source means for producing a beam of energetic positively charged particles and neutralizer cell means arranged to convert said charged particles into said beam of neutral particles directed along the beam path into said reactor containment zone.

3. Apparatus as defined in claim 2 wherein said beam of energetic positively charged particles comprise at least one positive ion of a nuclide selected from the group consisting of $^1H$, $D$, $T$, $^3He$ and $^6Li$.

4. Apparatus as defined in claim 3 wherein said collector-converter cell means comprises an enclosure having an opening in one side with a first grid arranged thereacross for passage of said deflected charged particle beam therein and arranged to be connected to ground potential;

a second grid disposed in spaced relation to said first grid within said enclosure and arranged for application of a negative potential thereto for repelling electrons from said deflected charged particle beam and allow positive ions of the beam to pass therethrough as a positive ion beam; and a collector electrode assembly comprising a closed vessel supported in insulated relation having an opening in one side arranged for entry of said positive ion beam and a grid arranged across said opening, said collector electrode assembly being arranged for application of a positive retarding potential thereto to slow said positive ions which accordingly impinge upon collector assembly components with small residual energy and acquire an electron so as to generate an electrical current in a circuit connected thereto.

5. Apparatus as defined in claim 4 including gas ionizer cell means arranged for passage of energetic neutral particles emergent from said containment zone for converting said energetic neutral particles into a beam of energetic positive ions;

expander means arranged to expand said beam of energetic positive ions along a divergent path;

and a second collector electrode assembly arranged for converting the kinetic energy of the beam of positive ions into electrical current.

6. Apparatus as defined in claim 5 wherein said energetic neutral particle beam comprises a plurality of different molecular weight ionic species wherefor said magnetic field deflects said ions along a plurality of beam paths, and wherein one of said collector electrode assemblies is arranged to intercept each respective one of said beams of ionic species.

7. Apparatus as defined in claim 5 wherein said ionic species comprise $D^+$, $D_2^+$ and $D_3^+$ ions.

* * * * *